April 10, 1962  R. R. VAN DER BECK, JR  3,029,160
MANUFACTURE OF ABRASIVE COATED PRODUCTS
Filed Oct. 21, 1957
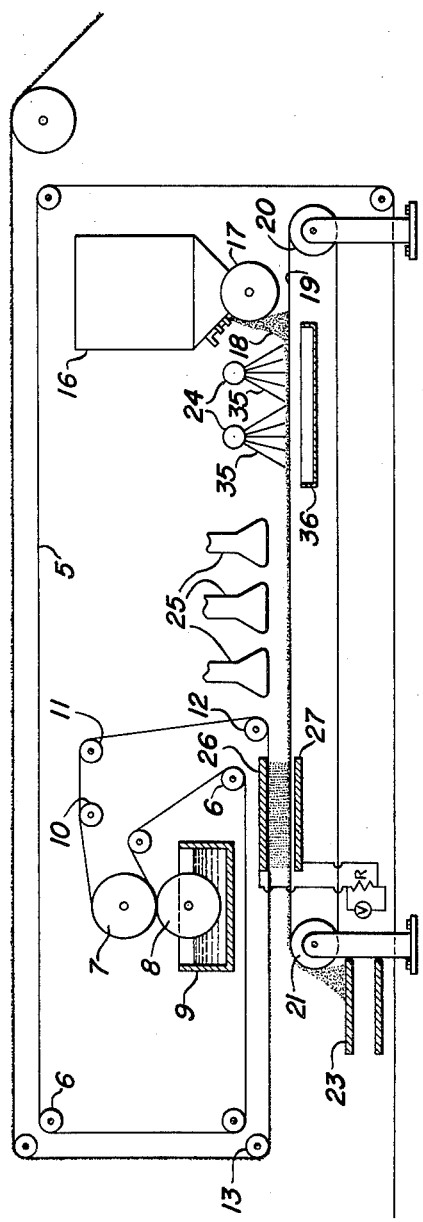
FIG. I.
INVENTOR.
ROLAND R. VAN DER BECK, JR
BY
ATTORNEY

United States Patent Office 3,029,160
Patented Apr. 10, 1962

3,029,160
MANUFACTURE OF ABRASIVE COATED
PRODUCTS
Roland R. Van Der Beck, Jr., Greensburg, Pa., assignor to The Carborundum Company, Niagara Falls, N.Y., a corporation of Delaware
Filed Oct. 21, 1957, Ser. No. 691,207
11 Claims. (Cl. 117—100)

This invention relates in general to a method for improving the projectability of abrasive grain that is applied to an adhesive-coated backing in an electrostatic field.

In the art of making sandpaper, emery paper, abrasive cloth, and similar coated abrasive articles, an adhesive or making coating is applied to a backing, and grains of abrasive substances are applied on the adhesive coated surface of the backing. One way of applying the abrasive grain to the backing involves the use of an electrostatic field. The electrostatic field is employed to project the grain upward against the force of gravity, onto the adhesive-coated surface of the backing.

In the electrostatic field, those abrasive grains which are projectable become oriented, with their long axes parallel to the flux lines of the field, which is normally perpendicular to the backing. In an electrostatic field, the grains tend to repel each other, and there is a tendency to coat the backing more uniformly than is possible by other coating methods. In general it may be said that uniformity of grain distribution and orientation of the grain are superior properties of abrasive products produced by electrostatic projection. These advantages accrue from the process only to the extent, of course, that the grains are uniformly projectable.

Experience has shown that different abrasive grains have different characteristics of projectability in an electrostatic field. Some grains are intrinsically projectable, and have good projectability. Other grains have no inherent projectability. Still other grains, such as fused alumina, for example, are projectable, but their projectability characteristics are poor and non-uniform. For example, the projectability characteristics of fused alumina grain and of other grains may vary from lot to lot. Moreover, when fused alumina grain and certain other grains are exposed to the atmosphere over a period of time, projectability deteriorates or decays, and eventually falls to zero.

Aside from the inherent characteristics of a particular grain, its grain size and mass are also important factors in determining the projectability. As the mass of the individual grains increases, projection becomes more and more difficult because greater forces are required.

The relative humidity of the atmosphere appears to play a very important role in determining how grain will project, and its stability against diminishing projectability. Commercial production often is seriously affected in the winter months when the atmosphere has a relatively low moisture content and is not so seriously affected in the summer, when the air has a relatively high moisture content. While reasons other than humidity may explain the decay in projectability of certain abrasive grains, the projectability problem and its associated decay phenomenon is observed whenever there is exposure to the atmosphere, even without any motion or frictional contact of the abrasive grains.

One object of the present invention is to provide a process for enhancing the projectability of those abrasive grains that are characterized by poor inherent projectability.

Another object of the invention is to provide a process for stabilizing certain abrasive grains against deterioration or decay of projectability.

A related object of the invention is to provide a process of the character described that is inexpensive, that requires little space, that does not require the use of expensive capital equipment, and does not add materially to the cost of the product.

Still another object of the invention is to improve the uniformity of projectability of abrasive grains that are ordinarily characterized by intrinsic projectability, which, for example, differ considerably in degree of projectability from lot to lot.

Another related object of the invention is to improve the projectability characteristics of abrasive grains to make feasible the electrostatic projection of grains in larger grain sizes than has been considered possible in the past.

A further object of the invention is to improve the projectability, and stabilize the improved projectability against decay, of electrically non-conducting abrasive materials, such as, for example, alumina, ground glass, ground quartz, ground sapphire, garnet, and similar materials.

Yet another object of the invention is to provide a process that will improve the projectability of abrasive grain, and that will stabilize the projectability characteristics of abrasive grain against decay, without adverse effect on the quality of the abrasive product.

Other objects of the invention will become apparent to those skilled in the art from the following description of specific embodiments of the invention.

In the specific embodiments of the invention that are described, the projectability of abrasive grains is improved, and stabilized against diminution, deterioration or decay, by forming on the individual abrasive grains a surface deposit of colloidal size particles. The deposit is formed by wetting the surface of the individual grains with a dilute aqueous silica sol, or zirconia sol, or the like, then driving off the water to deposit colloidal particles on the surface of the individual grains. The treated grain may then be projected onto the adhesive-coated surface of a backing, either immediately or after storage.

The sol may be applied to the abrasive grains in any convenient manner, as by tumbling in a mixer, spraying, or other method. In the ordinary manufacturing processes for making coated abrasives, a mass of abrasive material, such as alumina, is crushed, sized, and washed; and it is then stored, or immediately used in coating operations, depending on production needs. A convenient time to apply the sol, to improve projectability characteristics, is during or immediately after the washing step, as a part of conventional plant processing of the abrasive grain. In the detailed description of a production process that follows, a spraying process is described for applying the sol to the grain. It should be understood that this is one preferred method of application of the sol that is available, and that other mechanisms to effect a deposit of colloidal particles on the grain may be employed.

The aqueous vehicle may be driven off by radiant heating, or in a stationary drier, or by passing the grain through an oven, or in any other convenient way.

The invention may be best understood by reference to the drawing, and from a consideration of the following detailed description thereof.

In the drawing:
FIG. 1 is a schematic view illustrating one form of apparatus for carrying out the process of the invention.

The method of making abrasive sheet with the type of apparatus illustrated in the drawing includes the several steps of feeding a web of backing material, such as paper or cloth, at a predetermined speed, applying adhesive to one side of the backing, then moving the backing with the adhesive coating facing downward, above, parallel to, and in the same direction, as a traveling conveyor belt. The adhesive coated backing is moved over the belt, and the belt and backing are simultaneously passed through an electrostatic field, adjacent one end of the conveyor belt. At the opposite end of the conveyor belt, abrasive grain or grit is continuously fed, in a substantially uniform layer, onto the surface of the conveyor belt. As the belt carries it along toward the electrostatic field, the grain is first sprayed with a dilute silica sol, then is heated to remove the water and to form on the grain a surface deposit of collodial particles of silica. The grain is then passed into the electrostatic field, and is projected upward against the adhesive-coated surface of the backing.

Referring now in detail to the drawing, the flexible backing web 5 is fed over a series of rollers 6, and over the upper roller 7 of a pair of squeeze rollers. The lower roller 8 of said squeeze rollers is mounted to contact an adhesive material maintained in a tray or tank 9. The lower roller 8 applies a uniform adhesive coating to one surface of the backing. After receiving the adhesive coating, the web is fed over rollers 10 and 11 and is brought back over a roller 12, so that the adhesive-coated surface of the backing is presented downwardly. The web is then trained or fed over a roller 13, from which it is passed to suitable drying mechanism.

The abrasive grains are supplied from a hopper 16 that has a conventional outlet 17 which feeds a layer 18 of grain to a moving, foraminous conveyor belt 19. The conveyor belt 19 is an endless belt that is mounted to travel over and around rollers 20 and 21. The speed at which the conveyor belt is caused to travel can be adjusted by controlling the rate of rotation of the rollers 20, 21, respectively. The rollers 20, 21, are mounted in a conventional frame that may be raised and lowered, as desired, to adjust the distance between the surface of the conveyor belt and the backing 5.

A second conveyor 23 is mounted below the discharge end of the first conveyor 19, to carry away any abrasive grain that drops off the end of the first conveyor.

A plurality of pipes 24 are mounted transversely of the conveyor belt 19, and are formed with a plurality of apertures to throw a spray 35 downwardly, to wet the layer of abrasive grain on the conveyor with the silica sol. A tray 36 is mounted beneath the conveyor to catch and recover any excess sol that drips from the grain on the conveyor.

Farther along the conveyor belt a sufficient distance to permit the abrasive to drip dry, there are mounted a bank of infra-red lamps 25, of sufficient power to dry the abrasive grain.

At the point where the backing and the upper flight of the conveyor 19 begin their parallel run, there are provided a pair of electrically charged electrodes 26, 27. The upper electrode 26 is located immediately above the backing, and the lower electrode 27 is located immediately below the upper side of the conveyor belt 19. A sufficient difference of potential is maintained between the electrodes 26, 27 to produce a strong static field. This static field must be sufficient to move the abrasive grain from the surface of the upper flight of the conveyor belt 19 toward the adhesive coated surface of backing.

As the abrasive grain enters the field between the electrodes 26 and 27 it becomes charged with the charge of the lower plate, and is propelled toward the upper plate 26, and a substantial quantity of the grain becomes embedded in the adhesive coated surface of the backing. Any grain that fails to adhere or to project remains on the conveyor 19, and is dropped off onto the second conveyor 23.

The operation of the device will be substantially obvious from the foregoing description. Abrasive grain is fed by the hopper above the conveyor belt, is sprayed with the silica sol, is dried by the heat of the infra-red lamps 25, and is then projected to become embedded in the adhesive coated surface of the backing.

To measure the projectability of the abrasive grain, a 1 megohm resistor R is interposed between the two electrodes 26, 27, and a voltmeter V is connected across the resistance. The readings on the voltmeter provide a measure of projectability, since the current passed between the upper and lower electrodes 26 and 27, and the resistance between these two electrodes, is determined by the amount of abrasive grain that is projected upwardly to transfer its charge to the upper plate or electrode.

The preferred sol for treatment of the abrasive grain is a silica sol that has been diluted with sufficient water so that the grain can be wetted to leave a substantially uniform deposit of colloidal silica on the surface of the grain in the amount of about 1% silica based on the weight of the grain, dry basis. Concentrated colloidal silica is employed in accordance with the present invention and is readily available in the form of aqueous sols containing approximately 1% to 30% $SiO_2$. The commercial 30% sols, typically, have the following physical properties and approximate chemical composition:

| | |
|---|---|
| $SiO_2$ | 29% to 31% by weight. |
| Sodium as $Na_2O$ | 0.31% to 0.41%. |
| Sulphates as $Na_2SO_4$ | 0.15% maximum. |
| pH | 9.5 to 10.5. |
| Specific gravity, °Bé | 24.7 to 26.4. |
| Viscosity of 25° C | 2.0 to 3.3 cps. |
| Freezing point | 32° F. (silica irreversibly precipitated). |

These sols are well known, and are described, for example, in U.S. Patents 2,244,325, granted June 3, 1941, and 2,801,938, granted August 6, 1957. Ordinarily, colloidal silica compositions of this type are prepared by passing sodium silicate through ion exchange material. A very small amount of sodium is retained in the final product, and the amount of sodium present ordinarily determines the pH of the composition. Where the amount of sodium, as $Na_2O$, is in the range of 0.9% to 0.11% by weight, the pH at 25° C. would be in the range of 8.2 to 8.7. These silica compositions are stable below a pH of about 10.5. Above a pH of 10.5, precipitation of the silica will occur. Ordinarily, silica sols having a pH of 7 or higher are preferred, but silica sols having a pH on the acid side are stable and can be used.

More concentrated and more dilute sols can be employed in the practice of this invention. The silica sols that can be used are characterized by a silica content in the form of particles having an ultimate particle size not exceeding about 130 millimicrons, preferably less than 50 millimicrons, and more preferably in the range from 10 to 30 millimicrons. By "ultimate particle size" is meant the average particle present when the sol is diluted to about 0.1% $SiO_2$ with water and dried in a very thin layer deposit. Alkali ions are disposed around the surface of the silica particles so as to prevent condensation by oxolation. By adjusting the alkali content, sols containing up to about 45% by weight silica can be made stable. Ordinarily, the alkali content, expressed as $Na_2O$, may be in the range of 1 part by weight for each 10 to 100 parts by weight of silica. The concentration of silica in the silica sol that is used to wet the abrasive grain may be adjusted over a wide range, based on economic considerations, but preferably should be sufficient to leave a deposit on the surface of the abrasive grain of about 0.25% to about 1% of silica by weight of the abrasive grain. A surface deposit of particles of colloidal silica amounting to about 0.25% and even less by weight of the abrasive grain (dry basis) is sufficient to improve projectability markedly and to stabilize the projectability against deterioration or decay. On the other hand, when the deposit of colloidal silica significantly exceeds 1% by weight of the abrasive grain, the projectability and stability are improved, but not in proportion to the amount of silica that is employed.

When a dilute silica sol is heated to drive off the water, colloidal sized silica particles are deposited. These have previously been formed by the condensation of silicic acid molecules to form highly cross-linked, spherical micelles. The ultimate particles that are deposited tend to be spherical in nature, are discrete, and are characterized by a tremendous surface area. For the commercial product identified above, the range of particle size in the surface deposit of colloidal silica is about 10 to about 30 millimicrons, with an average size of about 15 millimicrons. Other commercial products may have somewhat different colloidal size particles.

The silica micelle is charged negatively, and contains about 33,000 silica nuclei. In the aqueous sol, positively charged sodium ions tend to surround the negatively charged, spherical micelles.

Several demonstrations were made for the purpose of observing the improvement in projectability, and stability against decay, attributable to the process of this invention. The results of these demonstrations are summarized below in Table 1. The individual demonstrations were conducted using 100 gram samples of 36 mesh fused alumina grain.

The control sample of 100 grams of standard fused alumina grain, 36 mesh, received no treatment. Its projectability was measured directly, and then after being exposed to an atmosphere having a relative humidity of 32%. The projectability was then measured after three hours of exposure, and after 24 hours of exposure.

Other hundred gram samples of 36 mesh fused alumina grain, from the same lot as the control, were treated with the sols, to deposit different amounts by weight of colloidal silica on the surface of the abrasive grain. The projectability of each batch was then measured immediately after the solution had been dried to form the deposit on the grain, and then after the treated grain had been allowed to stand in an atmosphere of 32% relative humidity for 3 hours, and for 24 hours.

In each case, the wetted grain was dried rapidly under an infra-red lamp.

Two types of commercially available colloidal silica were employed. One such sol, having the analysis indicated above, is sold by the Du Pont Company under the trademark "Ludox," and a second, slightly less transparent solution, is sold by the Monsanto Chemical Company under its trademark "Syton."

The results of these treatments and measurements are tabulated below.

TABLE 1

*Showing Projectability Imparted by Colloidal Silica to Alumina Grain*

| Treatment of 36 grit fused alumina grain | Projectability at 32% relative humidity | | |
|---|---|---|---|
| | Initial | 3 hr. | 24 hr. |
| Control (no treatment) | 2.5 | 0 | 0 |
| "Syton" deposit: | | | |
| 0.5% [1] | 13 | 8 | 6.5 |
| 1.5% | 14.5 | 12.5 | 11 |
| 2.6% | 15 | 13 | 11 |
| 5.2% | 20 | 18.5 | 13.8 |
| "Ludox" deposit: | | | |
| 1% | 8 | 5.5 | 4.25 |
| 3% | 11 | 11 | 11 |

[1] Percent silica by weight of grain, dry basis.

From the results tabulated above, it may be observed that the control sample had extremely low initial projectability, and that this low projectability was zero after only three hours of exposure to the atmosphere at 32% relative humidity. The extremely low projectability exhibited by the "untreated" control sample is present only because of the treatment of the grain in conventional processing techniques. The initial projectability is so low as to be virtually riseless.

Where the deposit of silica on the surface of the grain exceeded 1% by weight of the grain, some dusting was noted when the grain was disturbed; where the deposit of colloidal silica was 1% by weight of the grain or less, little or no evidence of the deposit was visible to the naked eye.

It can be noted from the results in the table that the deposit of silica on the surface of the grain markedly improves the initial projectability of the grain, and stabilizes the projectability against diminution.

A number of subsequent demonstrations were made, and the subsequent demonstrations confirmed the data summarized above.

To demonstrate the invention on a larger scale, on a pilot plant machine, 39 pounds of 36 mesh fused alumina grain was wetted with a dilute sol made from 4500 cc. of water and 90 cc. of 30% concentration "Ludox" colloidal silica. The grain was placed in a large mixer, somewhat similar in structure to a large cement mixer. The dilute silica sol was added to the mixer, and the mixer was operated to tumble the grain and wet it thoroughly. The wetted grain was then transferred to a stationary drier, and the water was driven off. No indication of a surface coating or deposit was visible after drying. The grain was not stirred during drying, but no agglomeration occurred.

This treated batch of abrasive grain was tested on a small, pilot plant machine, and the projectability was very high. The cut obtained from the abrasive sheet prepared with this grain was above standard. Other demonstrations of the invention on a commercial scale indicated that grain treated according to this invention has a high and uniform projectability, and produces a premium quality product.

Still other demonstrations of the invention were made using garnet grain. Ordinarily, with standard garnet grain, considerable difficulty is experienced in applying the grain uniformly to the paper. It is the tendency of garnet to project onto the paper in streaks, to produce abrasive papers or cloths on which the garnet is distributed non-uniformly. The non-uniformity is a sufficient detriment that "rejects" frequently run from 10% to 25% of the product.

A batch of 180 grit garnet, on which colloidal size particles of silica had been deposited, was coated on an adhesive backing electrostatically, and the coating was so uniform that there was substantially no loss of product, and there was no difficulty in the coating operation. Moreover, although the coated product had "open coat" weight, the coating was so uniform that the product had a "closed coat" appearance. The treatment of the garnet destroyed the tendency of the garnet grain to agglomerate during handling and projection.

To demonstrate the efficacy of colloidal zirconia, 100 g. of fused alumina grain was treated with 5 cc. of a composition consisting of a sol containing 25% of colloidal zirconia, diluted with sufficient water to wet all of the grain. The water was then driven off to deposit about 1% by weight of colloidal zirconia on the grain. The improvement in projectability and stability against decay were markedly improved, and were superior even to the results obtained with a silica deposit.

On the basis of these demonstrations, it would appear that the same improvement in projectability characteristics could be obtained by any surface deposit of colloidal-sized particles. Particularly good results could be expected from colloidal-sized particles that were spherical in nature. Such particles would tend to increase the surface area on the grain tremendously, to take and hold an electrostatic charge, and at the same time, the spherical surfaces of the particles would tend to retain the electrostatic charge without leakage.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:
1. As a new article of manufacture, a free-flowing mass of discrete, mobile, abrasive grain having improved projectability characteristics in an electrostatic field, each said grain having on its surface a substantially uniform dried deposit comprising a small amount up to about 5% by weight of said abrasive grain, dry basis, of discrete, colloidal size particles of electrically non-conductive material selected from the group consisting of silica and zirconia, said particles having an average size not exceeding about 130 millimicrons.

2. As a new article of manufacture, a free-flowing mass of discrete, mobile, abrasive grain characterized by improved projectability characteristics in an electrostatic field, each said grain having on its surface a substantially uniform dried deposit comprising a small amount up to about 1% by weight of said abrasive grain, dry basis, of particles of silica that have an average particle size of from about 10 to about 30 millimicrons, said deposit including sodium in an amount equivalent to an $SiO_2:Na_2O$ weight ratio of from about 10:1 to about 100:1.

3. As a new article of manufacture, a free-flowing mass of discrete, mobile, abrasive aluminum oxide grain, each grain having formed on its surface a substantially uniform dried deposit comprising a small amount up to about 1% by weight of said abrasive grain, dry basis, of colloidal size particles of silica having an average size in the range up to about 130 millimicrons, said deposit imparting to said grain substantial uniformity of projectability in an electrostatic field and stability against decay of projectability.

4. As a new article of manufacture, a free-flowing mass of discrete, mobile, abrasive garnet grain, each grain having formed on its surface a substantially uniform dried deposit comprising a small amount up to about 1% by weight of said abrasive grain, dry basis, of colloidal size silica particles having an average size in the range up to about 130 millimicrons, said deposit imparting to said grain substantial uniformity of projectability in an electrostatic field and stability against decay of projectability.

5. A method of treating abrasive grain to improve its projectability characteristics in an electrostatic field comprising wetting the surface of said grain with a dilute aqueous silica sol containing a small amount, up to about 5% by weight of said abrasive grain, dry basis, of colloidal silica, then removing the water to form a dried deposit substantially uniformly on the surface of the grain of particles of silica that have an ultimate particle size of up to about 130 millimicrons, said sol containing sodium in an amount equivalent to an $SiO_2:Na_2O$ weight ratio of from 10:1 to 100:1, while maintaining the grain in a discrete mobile state.

6. A method of treating abrasive grain to improve its projectability characteristics in an electrostatic field comprising wetting the surface of said grain with a dilute aqueous sol containing a small amount, up to about 1% by weight of said abrasive grain, dry basis, of colloidal silica, then removing the water to form a dried deposit substantially uniformly on the surface of said grain of particles of silica that have an ultimate particle size of from about 10 to about 30 millimicrons, said sol containing an alkali in a weight ratio equivalent to an $SiO_2:Na_2O$ weight ratio of from 10:1 to 100:1, while maintaining the grain in a discrete, mobile state.

7. An abrasive grain selected from the group consisting of fused alumina and garnet of improved projectability in an electrostatic field, said grain having a substantially uniform dried coating on its surface selected from the group consisting of colloidal silica and colloidal zirconia, the particle size of the coating being about 130 millimicrons and smaller, and the coating comprising a small amount up to about 5% by weight of said grain, dry basis.

8. An abrasive grain as defined in claim 7 wherein the particle size of the coating is from about 10 to about 30 millimicrons and the coating comprises a small amount up to about 1% by weight of said grain, dry basis.

9. An article of manufacture as defined in claim 2 wherein the abrasive grain is selected from the group consisting of fused alumina and garnet.

10. A method of treating abrasive grain selected from the group of fused alumina and garnet to improve its projectability in an electrostatic field comprising, wetting the surface of said grain with a dilute aqueous solution selected from the group consisting of colloidal silica and colloidal zirconia, removing the water to form a dried coating of substantial uniformity over the surface of said grain of particles of silica or zirconia of a size of about 130 millimicrons and smaller, said coating comprising a small amount up to about 5% by weight of said grain, dry basis, while maintaining the grain in a discrete, mobile state.

11. A method according to claim 10, wherein the particle size of the coating is from about 10 to about 20 millimicrons and the coating comprises a small amount up to about 1% by weight of said grain, dry basis.

References Cited in the file of this patent
UNITED STATES PATENTS

| Number | Name | Date |
|---|---|---|
| 2,527,044 | Walton et al. | Oct. 24, 1950 |
| 2,541,658 | Masin et al. | Feb. 13, 1951 |
| 2,563,774 | Debing | Aug. 7, 1951 |
| 2,768,087 | Bird | Oct. 23, 1956 |
| 2,805,959 | Ewing | Sept. 10, 1957 |
| 2,883,347 | Fisher et al. | Apr. 21, 1959 |
| 2,913,419 | Alexander | Nov. 17, 1959 |